(12) United States Patent
Durre et al.

(10) Patent No.: US 6,206,205 B1
(45) Date of Patent: Mar. 27, 2001

(54) PLEATED FILTER AND SUPPORT TUBE THEREFOR

(75) Inventors: Reynold F. Durre, Stevens Point; Laurie A. Buchberger, Plainfield; Greg Brace, Amherst Junction, all of WI (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/182,122

(22) Filed: Oct. 29, 1998

(51) Int. Cl.[7] .................................................. B01D 27/06
(52) U.S. Cl. ........................................ 210/457; 210/493.1
(58) Field of Search ..................................... 210/457, 458, 210/493.1, 493.2, 493.5, 497.01, 497.1, 497.2, 498, 487; 138/154, 156; 29/896.62; 55/521

(56) References Cited

U.S. PATENT DOCUMENTS

| | | |
|---|---|---|
| 2,801,009 * | 7/1957 | Bowers ............................. 210/493.2 |
| 3,042,216 | 7/1962 | Goldman . |
| 4,369,113 | 1/1983 | Stifelman . |
| 4,969,994 | 11/1990 | Misgen et al. . |
| 5,104,537 | 4/1992 | Stifelman et al. . |
| 5,252,207 * | 10/1993 | Miller et al. ........................ 210/489 |
| 5,460,721 | 10/1995 | Goodwin . |

FOREIGN PATENT DOCUMENTS

| | | |
|---|---|---|
| 197 45 924 A1 | 5/1998 | (DE) . |
| 0 353 622 A1 | 2/1990 | (EP) . |
| 0 568 381 A1 | 11/1993 | (EP) . |
| 1408804 * | 10/1975 | (GB) ............................ B01D/27/06 |
| 867397 * | 10/1975 | (RU) ................................ 210/493.1 |
| WO 92/16280 * | 10/1992 | (WO) ................................ 210/489 |

* cited by examiner

Primary Examiner—Matthew O. Savage
(74) Attorney, Agent, or Firm—Merchant & Gould P.C.

(57) ABSTRACT

A filter support includes a tubular construction that has flow apertures, a top edge, an opposite bottom edge, and first and second side edges extending between the top and bottom edges. The first and second side edges oppose each other to form a seam region having a non-axial seam center line extending between the top edge and the bottom edge.

12 Claims, 4 Drawing Sheets

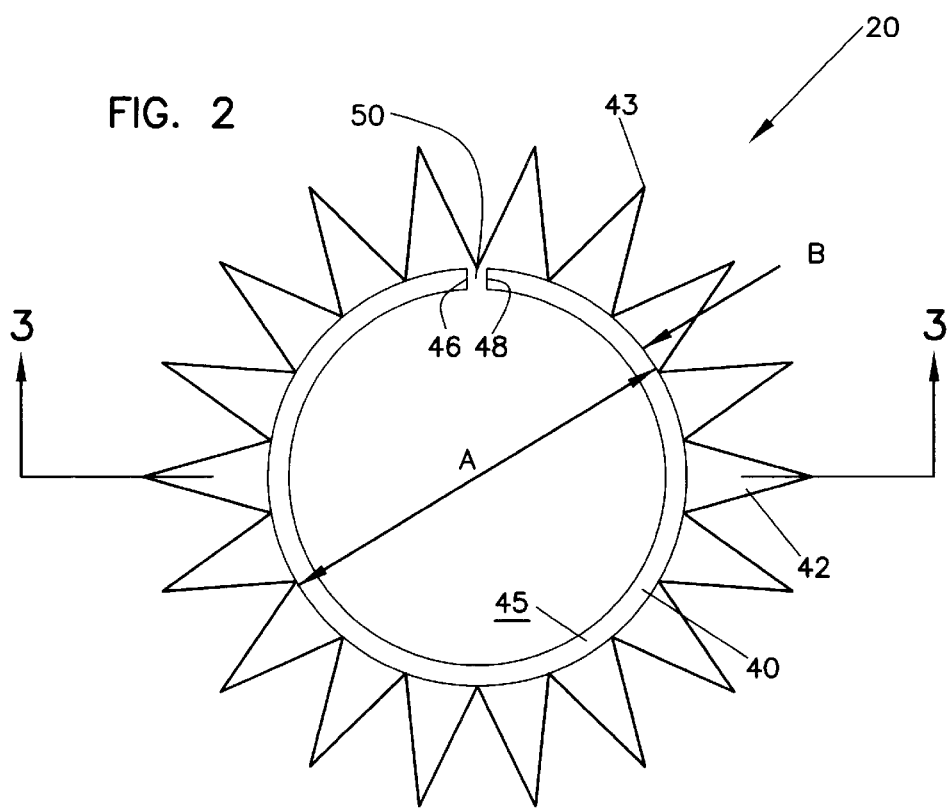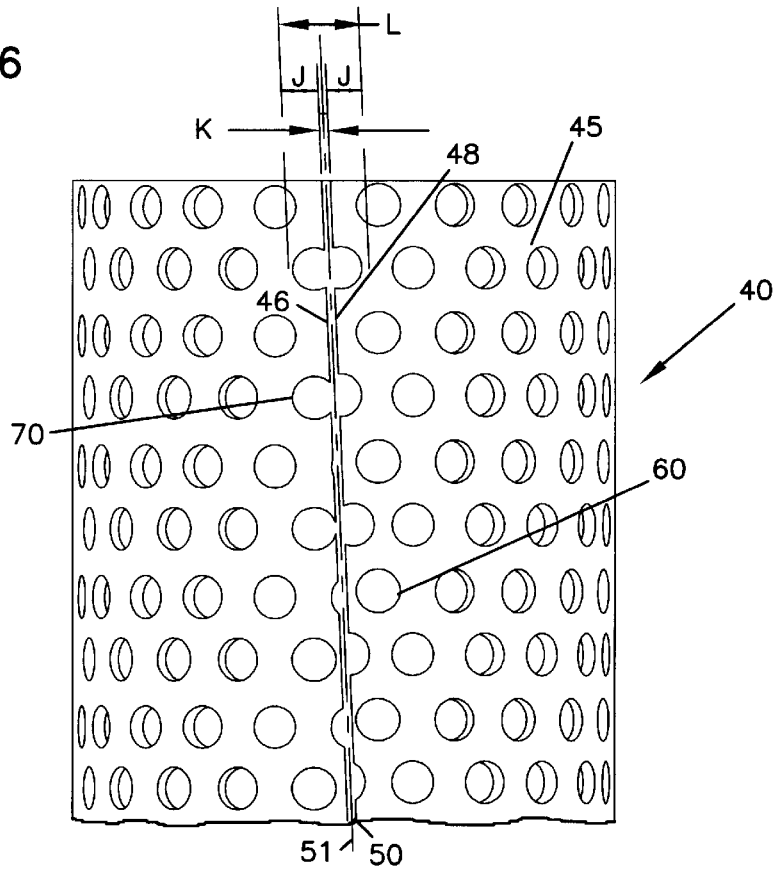

PLEATED FILTER AND SUPPORT TUBE THEREFOR

FIELD OF THE INVENTION

The disclosure describes filter constructions for engines and methods. In particular, the disclosure describes an inner support tube and improvements associated with the manufacture of such tubes.

BACKGROUND OF THE INVENTION

Filter constructions used for engines sometimes include a center tube to provide the structural strength necessary to keep the filter media from collapsing due to the pressure differential across the filter as the filter media becomes plugged with contaminant. The inner support tube typically allows for the passage of gas or liquid therethrough, in order for the filter to operate properly. For example, the tube may be perforated or constructed from an expanded metal.

In some constructions, the inner support tube is formed by rolling the metal sheet into a cylinder and either welding the ends together at a seam, or bending the ends together to form a lock seam.

SUMMARY OF THE INVENTION

In one aspect of the present invention, one example embodiment involves a filter support including a tubular construction that has flow apertures, a top edge, an opposite bottom edge, and first and second side edges extending between the top and bottom edges. The first and second side edges oppose each other to form a seam region having a non-axial seam center line extending between the top edge and the bottom edge.

In another aspect of the present invention, a filter construction includes a region of pleated media and a tubular construction supporting the region of pleated media. The tubular construction has structure as previously described.

BRIEF DESCRIPTION OF THE DRAWINGS

FIG. 2 is a schematic, end view of a filter element constructed according to an example embodiment of the present invention;

FIG. 6 is a schematic, enlarged view of a portion of a seam of the support tube of FIG. 3, according to an example embodiment of the present invention.

DETAILED DESCRIPTION

A. Some Problems with Conventional Arrangements.

For filters used in applications requiring moderately high collapse strength, i.e. on the order of three hundred pounds per square inch (psi) to six hundred psi, the thickness of the inner perforated support tube does not lend itself to an overlapped or lock seam type of joint, where the two ends are bent, overlapped, and pulled back to lock the ends in place. The thicker the material, the more difficult it becomes to bend. In these situations, the filter industry sometimes welds the two ends together. In order to meet cleanliness and corrosion resistance requirements of some filters in certain instances, these tubes are plated after welding. This entire process results in an expensive center tube. In addition, in order to create a sufficiently strong weld, an unperforated margin is necessary along the seam. These unperforated edges prevent fluid flow that results in reduced performance of the filter assembly.

Improvements in the construction of a filter center tube are desirable.

B. FIGS. 1–6

Figure 1:
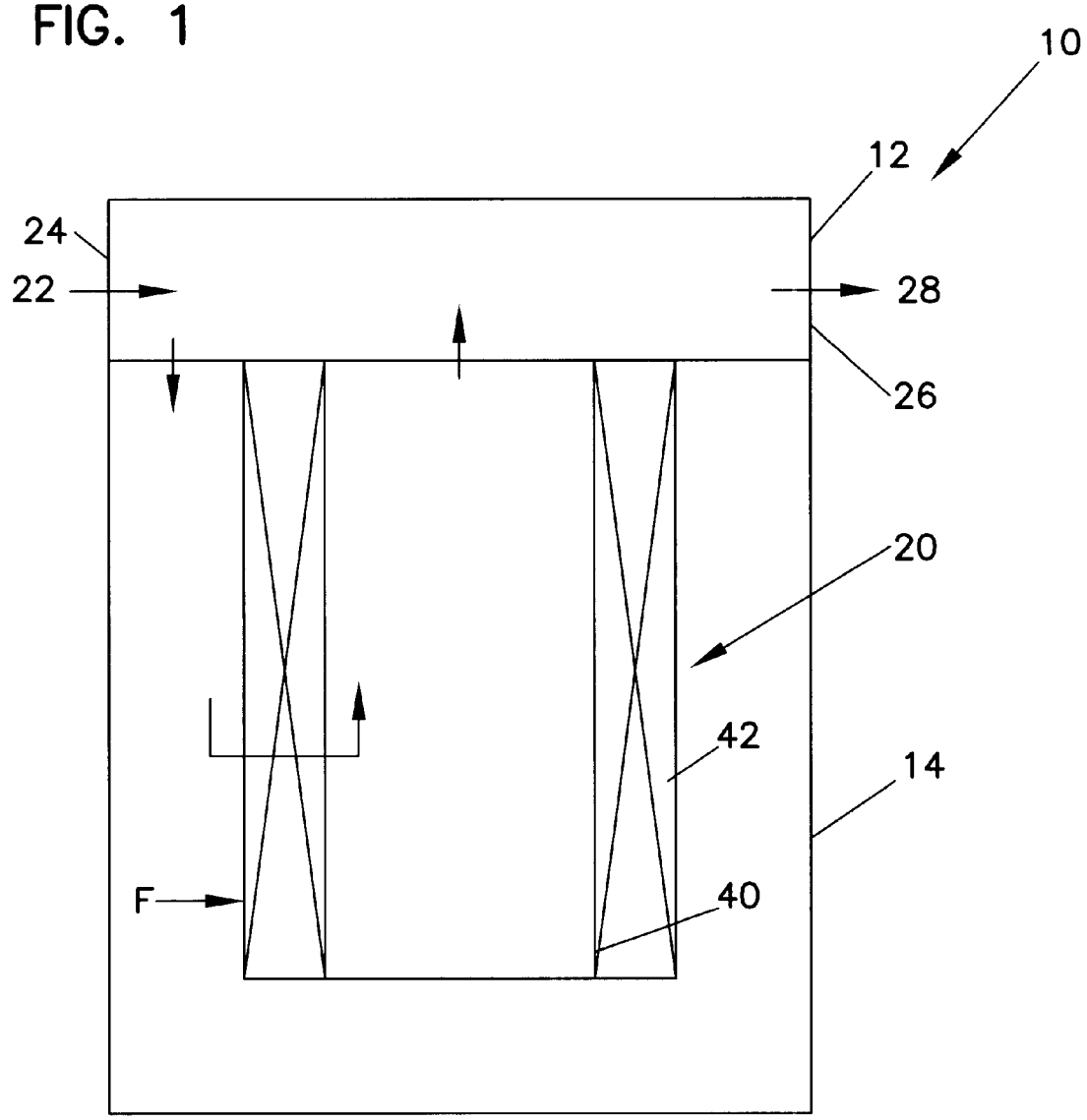
FIG. 1 is a schematic, partially side elevational, partially cross-sectional view of a liquid filter assembly, according to an example embodiment of the present invention.

Attention is directed to FIG. 1. FIG. 1 illustrates an example of a type of filter construction or assembly. In particular, the assembly illustrated is a liquid filter assembly. This may include, for example, an oil filter, a hydraulic filter, or a fuel filter. The filter assembly is shown in general at 10. The filter assembly 10 shown includes a base or head 12 and a cartridge 14 removably and replaceably mounted to the filter head 12. The head 12 is shown as a schematic side elevational view while the cartridge 14 is shown in schematic cross-section. The cartridge 14 has a filter element 20 within it. In 10 general, the liquid to be filtered passes in at arrow 22 through an inlet 24 in the filter head 12, into the cartridge 14, through the filter element 20, out the cartridge 14, and out through an outlet 26 in the filter head 12 at arrow 28. Preferably, as the liquid passes through the filter element 20, contaminants are removed from the liquid.

In the preferred embodiment, the filter element 20 includes a center support tube 40 and a region of filter media 42. The filter media 42 removes contaminants from the liquid as the liquid passes through the filter element 20. Attention is directed to FIG. 2. FIG. 2 is an end view of the filter element 20 of FIG. 1. Preferably, the filter media 42 comprises a pleated filtering material, such as pleated paper. The pleats are illustrated generally at 43 and help to support the filter media 42 and provide increased surface area for filtering. Generally, the pleats 43 are parallel with a central longitudinal axis of the support tube 40. The support tube 40 prevents the filter media 42 from collapsing due to pressure differentials across the filter media 42 as the filter media 42 becomes clogged with contaminants. In other words, referring back to FIG. 1, as the liquid flow follows arrow 22, the liquid exerts an inward force F on the filter media 42 as the liquid passes through the filter media 42. As the filter media 42 becomes clogged with contaminants, the inward force F exerted by the liquid flow increases. The support tube 40 prevents the filter media 42 from collapsing inward under this inward force F, and thus the support tube 40 maintains the integrity of the filter element 20 under varying conditions.

Referring back to FIG. 2, in the preferred embodiment, the support tube 40 has a generally tubular or cylindrical, non-solid, rigid construction and is completely surrounded by the filter media 42. The support tube 40 has a side wall 45 having first and second side edges 46, 48. The first and second side edges 46, 48 abut or meet, defining a gap or seam in a seam region 50. Preferably, the side edges 46, 48 are aligned with one another. By the term "aligned," it is meant that the side edges 46, 48 meet such that the side wall 45 is relatively continuous at the seam region 50 as illustrated in FIG. 2. Alternatively, the side edges 46, 48 may be mismatched. By the term "mismatched," it is meant that the side edges 46, 48 do not align to form a relatively continuous side wall 45.

Preferably, the support tube 40 has an outside diameter A of a least 1.5 inches, for example between 1.5 inches (38.1 mm) and 5.0 inches (127.0 mm), and typically has an outside diameter A of 1.91 inches (48.5 mm). The support tube 40 also has a thickness B. The thickness B partially, along with the type of material used, determines the strength of the support tube 40 and its ability to resist the inward force F (FIG. 1) exerted by the liquid flow. In some applications, this inward force F is large, and the thickness B of the support tube 40 preferably is sufficient to provide enough support to prevent the filter media 42 from collapsing as a result of the inward force F. Preferably, the thickness B of the support tube 40 is between 0.02 (0.51 mm) inches and 0.08 (2.03 mm) inches and typically is 0.058 inches (1.47 mm).

Figure 3:
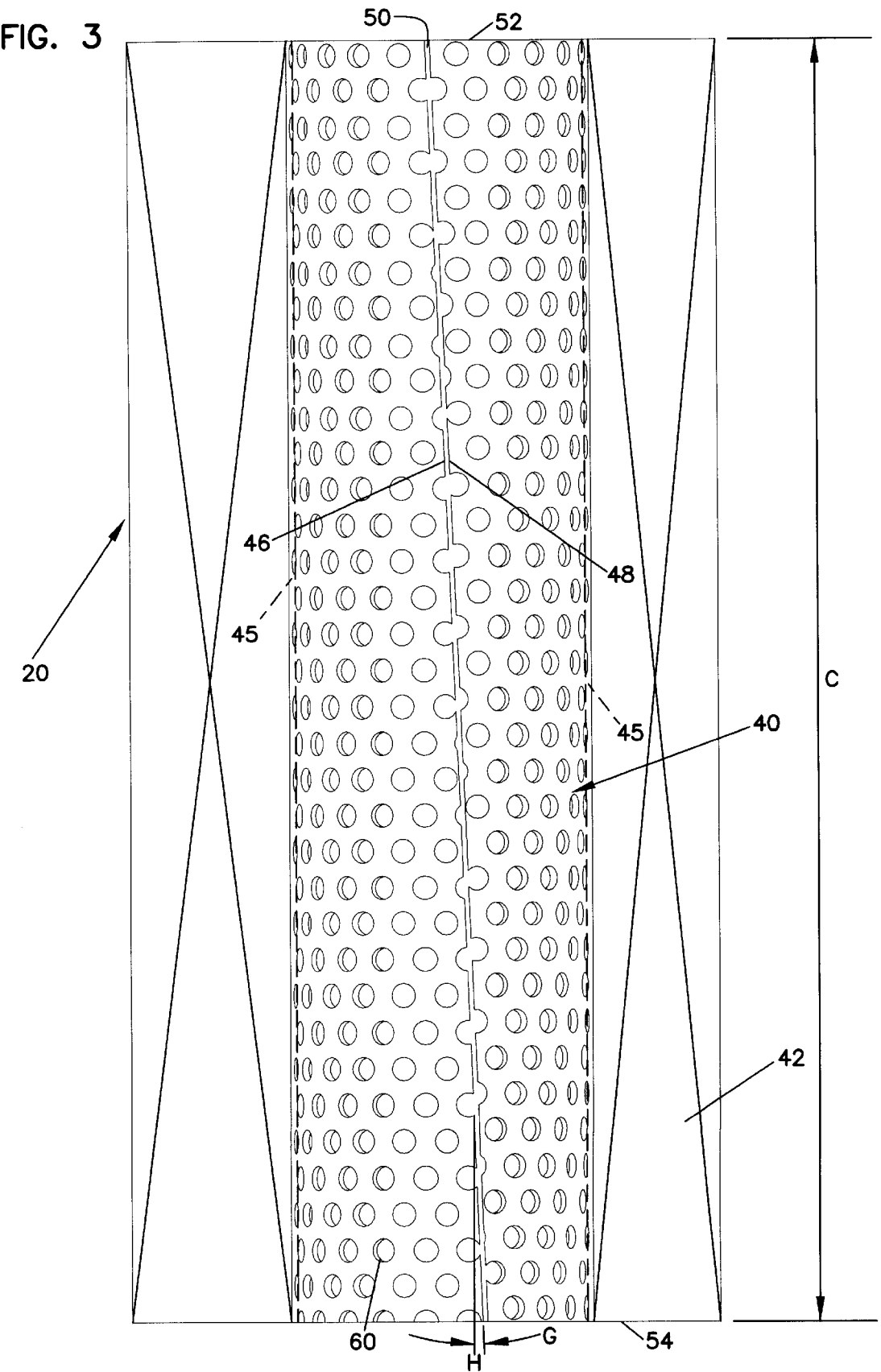
FIG. 3 is a schematic, cross-sectional view of the filter element depicted in FIG. 2 and taken along the line 3—3, according to an example embodiment of the present invention.

Attention is directed to FIG. 3. FIG. 3 is a cross-section of the filter element 20 of FIG. 2. Preferably, the support tube 40 has a top 52 and an opposite bottom 54. The side wall 45 and the side edges 46, 48 extend between the top 52 and the bottom 54. Preferably, the top 52 and the bottom 54 of the support tube 40 are open. Typically, the bottom 54 is closed during manufacture of the filter assembly 10 (FIG. 1) by an end cap (not shown). The liquid passes through the open top 52 as the liquid leaves the cartridge 14 (FIG. 1). The support tube 40 has an axial length C extending between the top 52 and the bottom 54 of the support tube 40. Preferably, the length C is at least 1 inch, for example between 2.5 inch (63.5 mm) and 16.0 inches (406.4 mm) and typically is 8.0 inches (203.2 mm).

Figure 4:
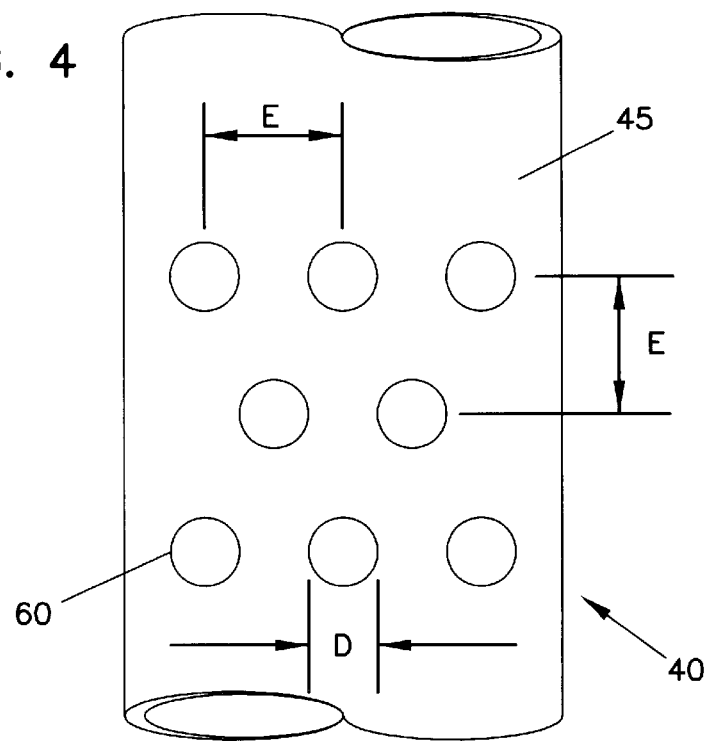
FIG. 4 is a schematic, enlarged view of a portion of a support tube of the filter element depicted in FIG. 3, according to an example embodiment of the present invention.

Preferably, the support tube 40 has flow apertures, holes, or gaps, for example perforations, illustrated generally at 60 in the side wall 45. The apertures 60 allow the liquid to pass through the support tube 40 as shown in FIG. 1. Attention is directed to FIG. 4. FIG. 4 is an enlarged view of the support tube 40 illustrating the apertures 60. Preferably, the apertures 60 are circular and have a diameter D between 0.06 inches (1.52 mm) and 0.18 inches (4.57 mm) and typically have a diameter D of 0.125 inches (3.175 mm). Preferably, the apertures 60 are staggered along the side wall 45 of the support tube 40 as illustrated in FIG. 4. In the preferred embodiment, the apertures 60 are spaced apart a first distance E between 0.125 inches (3.175 mm) and 0.375 inches (9.525 mm), and typically are spaced apart 0.25 inches (6.35 mm). In an alternative embodiment, the apertures 60 align vertically and horizontally along the side wall 45 of the support tube 40. That is, the apertures 60 are not staggered. Generally, the apertures 60 exist throughout or around the entire side wall 45. That is, preferably, the apertures 60 comprise between ten percent and thirty-three percent of the side wall 45 of the support tube 40 and typically comprise twenty-three percent. Thus, twenty-three percent of the support tube 40 is open, allowing the liquid to pass through.

Figure 5:
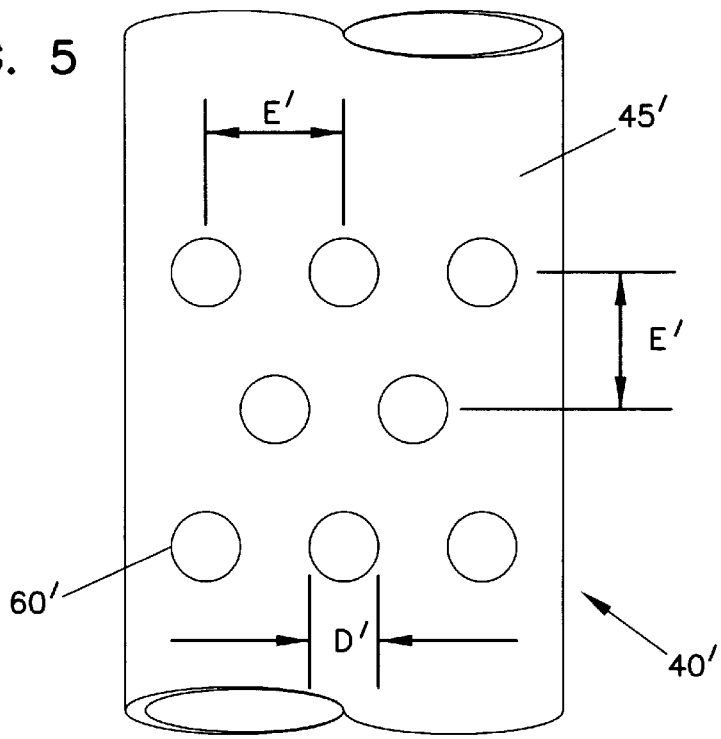
FIG. 5 is a schematic, enlarged view of a portion of a support tube, according to another example embodiment of the present invention.

Attention is directed to FIG. 5. FIG. 5 is an enlarged view of a support tube 40' illustrating apertures 60' according to another example embodiment. Preferably, the apertures 60' are circular and have a diameter D' between 0.06 inches (1.52 mm) and 0.18 inches (4.57 mm) and typically have a diameter D' of 0.09 inches (2.29 mm). The apertures 60' are staggered along the side wall 45' of the support tube 40'. In the preferred embodiment, the apertures 60' are spaced apart a second distance E' between 0.125 inches (3.175 mm) and 0.375 inches (9.525 mm), and typically are spaced apart 0.19 inches (4.83 mm). Preferably, the apertures 60' comprise between ten percent and thirty-three percent of the side wall 45' of the support tube 40' and typically comprise twenty-three percent.

Referring back to FIG. 3, preferably, the filter element 20 (FIG. 1) includes a system for joining the side edges 46, 48 of the side wall 45 of the support tube 40 that allows fluid flow through the joined region while not interfering with the filter media 42. Attention is directed to FIG. 6. FIG. 6 is an enlarged, schematic view of the seam region 50 of the support tube 40. In the preferred embodiment, the side wall 45 has apertures 60 within a third distance J of the first and second edges 46, 48 of the side wall 45. Preferably the third distance J is 0.15 inches (3.81 mm). Providing apertures 60 in this area increases the flow of liquid through the seam region 50 of the support tube 40.

In the preferred embodiment, the seam region 50 is not welded or bent. The side edges 46, 48 merely abut at this location. Preferably, the seam region 50 is the region of the support tube 40 extending the third distance J from the first and second side edges 46, 48 and extending from the top 52 to the bottom 54 of the support tube 40. The seam region 50 also includes a fourth distance K or gap separating the first and second side edges 46, 48. In other words, the seam region 51 has a width L equal to two times the third distance J plus the fourth distance K. Preferably, the fourth distance K is between 0 inches (0 mm) and 0.1 inches (2.54 mm).

In the preferred embodiment, the seam region 50 has a seam center line 51. The seam center line 51 extends from the top 52 to the bottom 54 of the support tube 40 and divides the width L of the seam region 50 into two equal regions on either side of the seam center line 51. In the preferred embodiment, the seam center line 51 is non-axial. That is the seam center line 51 is non-parallel with the central longitudinal axis of the support tube 40. The seam center line 51 is angled between the top 52 and the bottom 54 of the support tube 40 at an angle G from a line H parallel with the central longitudinal axis of the support tube 40. The longitudinal axis is a line that extends between the top 52 and the bottom 54 of the support tube 40 through the center of the top 52 and the bottom 54 of the support tube 40. Preferably, the angle G is between 0.5 degrees and sixty degrees and typically is two degrees. Because the seam center line 51 is angled from the top 52 to the bottom 54 of the support tube 40, the pleats 43 (FIG. 2), which are parallel to the central longitudinal axis of the support tube 40, cannot fit within the seam region 50. Of course, the seam center line 51 could be angled the opposite direction from the line H parallel with the central longitudinal axis. In one example, the seam center line 51 is angled from the top edge to the bottom edge at an angle at least 0.5 degrees from a line parallel to a central longitudinal axis of the support tube 40. In one example, the angle G is no more than 60 degrees from the line parallel to the central longitudinal axis. In one example, the angle G is between 1 degree and 15 degrees from the line parallel to the central longitudinal axis. In one example, the angle G is between 0.5 degrees and 15 degrees.

In an alternate embodiment, the seam center line 51 and corresponding seam region 50 could have one or more break points connecting two or more straight, co-linear segments extending between the top 52 and the bottom 54 of the support tube 40. In another alternate embodiment, the seam center line 51 and corresponding seam region 50 could be arcuate.

In the preferred embodiment, to further increase the flow of liquid through the support tube 40, the side edges 46, 48 are non-straight. That is, the side edges 46, 48 have arcuate holes 70 as illustrated in FIG. 6. The arcuate holes 70 are formed during manufacture of the support tube 40. In the preferred embodiment, to manufacture the support tube 40, a flat sheet of material is stamped, creating the apertures 60 in the side wall 45. The flat sheet of material is cut to the appropriate size and rolled to form the cylindrical support tube 40. The cut is made at an angle corresponding to the angle G of the seam region 50 through the sheet of material containing the apertures 60. The cut is made without regard to where the apertures 60 lie along the flat sheet of material. Thus, the cut is made through the material and the apertures 60 of the side wall 45, creating the arcuate holes 70 in the side edges 46, 48.

The support tube 40 can be constructed from a variety of materials. Preferably, the support tube 40 is constructed from a metal, such as steel. In the preferred embodiment, the steel comprising the support tube 40 has a zinc and clear chromate coating to prevent corrosion and maintain cleanliness of the filter media 42. Because it is not necessary to weld the seam region 50, the zinc and chromate coating can be applied to the steel prior to forming the steel into the tubular shape of the support tube 40. This results in less-expensive manufacturing costs associated with the manufacture of the support tube 40.

What is claimed is:

1. A filter construction comprising:
   (a) a region of pleated media; and
   (b) a tubular construction supporting the region of pleated media; the tubular construction having flow apertures, a top edge, an opposite bottom edge, and first and second side edges extending between the top and bottom edges;
      (i) the first and second side edges opposing each other to form a non-welded seam region having a seam center line extending between the top edge and the bottom edge;
         (A) the seam center line being angled from the top edge to the bottom edge at an angle between 0.5 degrees and 15 degrees from a line parallel to a central longitudinal axis of the tubular construction.
2. A filter construction according to claim 1 wherein:
   (a) the region of pleated media includes a plurality of pleats; the pleats extending in a direction parallel to the central longitudinal axis.
3. A filter construction according to claim 1 wherein:
   (a) the pleated media comprises pleated paper.
4. A filter construction according to claim 1 wherein:
   (a) the seam center line is straight.
5. A filter construction according to claim 1 wherein:
   (a) the tubular construction includes at least a first region of flow apertures within 0.15 inches of the first side edge, and a second region of flow apertures within 0.15 inches of the second side edge.
6. A filter construction according to claim 1 wherein:
   (a) the first and second side edges are non-straight.
7. A filter construction according to claim 6 wherein:
   (a) the first and second side edges have arcuate holes.
8. A filter construction according to claim 1 wherein:
   (a) the tubular construction includes a plurality of holes; the plurality of holes defining a total open area of between 10–33 percent.
9. A filter construction according to claim 1 wherein:
   (a) the first and second side edges are in touching, abutting engagement along the seam.
10. A filter construction according to claim 1 wherein:
    (a) the tubular construction defines a diameter of at least 1.5 inches; and
    (b) the tubular construction defines an axial length between the top edge and the bottom edge of at least 1 inch.
11. A filter construction according to claim 1 wherein:
    (a) the tubular construction comprises metal.
12. A filter construction according to claim 1 wherein:
    (a) the first and second side edges are aligned with one another.

* * * * *